(12) United States Patent
Hong et al.

(10) Patent No.: US 12,169,908 B2
(45) Date of Patent: Dec. 17, 2024

(54) TWO-DIMENSIONAL (2D) FEATURE DATABASE GENERATION

(71) Applicant: Samsung Electronics Co., Ltd., Suwon-si (KR)

(72) Inventors: Hunsop Hong, Irvine, CA (US); Seongnam Oh, Irvine, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 497 days.

(21) Appl. No.: 17/508,850

(22) Filed: Oct. 22, 2021

(65) Prior Publication Data

US 2023/0131418 A1    Apr. 27, 2023

(51) Int. Cl.
   *G06T 3/06* (2024.01)
   *G06F 18/213* (2023.01)
   *G06N 3/02* (2006.01)

(52) U.S. Cl.
   CPC ............ *G06T 3/06* (2024.01); *G06F 18/213* (2023.01); *G06N 3/02* (2013.01)

(58) Field of Classification Search
   CPC .......... G06T 3/06; G06F 18/213; G06N 3/02; G06N 3/09; G06V 10/40; G06V 10/774; G06V 10/764
   See application file for complete search history.

(56) References Cited

U.S. PATENT DOCUMENTS

| | | | |
|---|---|---|---|
| 6,400,841 B1* | 6/2002 | Khoury | G06T 7/0004 382/218 |
| 9,324,191 B2 | 4/2016 | Tytgat et al. | |
| 10,679,046 B1* | 6/2020 | Black | G06V 40/23 |
| 2010/0259538 A1* | 10/2010 | Park | G06T 13/40 345/473 |
| 2019/0130219 A1* | 5/2019 | Shreve | G06F 18/2148 |
| 2020/0012846 A1 | 1/2020 | Moravec et al. | |
| 2020/0193632 A1* | 6/2020 | Horikawa | G06T 7/50 |
| 2020/0250484 A1 | 8/2020 | Shreve et al. | |
| 2020/0312013 A1* | 10/2020 | Dougherty | G06V 20/64 |
| 2021/0232858 A1* | 7/2021 | Mukherjee | G06T 7/70 |

FOREIGN PATENT DOCUMENTS

| | | |
|---|---|---|
| CN | 111274927 A | 6/2020 |
| KR | 1964282 B1 | 3/2019 |
| KR | 20200044189 A | 4/2020 |

* cited by examiner

*Primary Examiner* — Edward F Urban
*Assistant Examiner* — Wassim Mahrouka
(74) *Attorney, Agent, or Firm* — Sherman IP LLP; Kenneth L. Sherman; Steven Laut

(57) ABSTRACT

One embodiment provides a method comprising acquiring 3D content comprising a 3D object in 3D space. The 3D object has object information indicative of a location of the 3D object in the 3D space. The method further comprises projecting the 3D object to a 2D object in 2D space based on the object information. The 2D object has one or more 2D vertices indicative of a location of the 2D object in the 2D space. The method further comprises determining one or more latent variables in the 2D space based on the object information and the one or more 2D vertices, and generating a 2D feature database including the one or more latent variables.

20 Claims, 12 Drawing Sheets

TWO-DIMENSIONAL (2D) FEATURE DATABASE GENERATION

TECHNICAL FIELD

One or more embodiments generally relate to generating training data for artificial intelligence (AI), in particular, a method and system of generating a 2D feature database.

BACKGROUND

In image or vision processing, a challenging aspect of utilizing learning-based approaches is scarcity of databases for training an AI engine. For example, conventional learning-based approaches focus on feeding large amounts of training data into an AI engine, where the training data comprises a large collection of image or video content. Utilization of the large amounts of training data may cost too much and may compromise accuracy, quality, and performance of the AI engine. Further, such approaches require much effort and resources, including human labor for annotating/labeling ground truth data to be used as training data. Also, image or video content may include some scene characteristics that may be difficult to annotate/label because these characteristics are based on capabilities of a camera used to capture the content and visual effects. For example, the AI engine may not be able to accurately predict boundary and position of a specific object in a scene.

SUMMARY

One embodiment provides a method comprising acquiring 3D content comprising a 3D object in 3D space. The 3D object has object information indicative of a location of the 3D object in the 3D space. The method further comprises projecting the 3D object to a 2D object in 2D space based on the object information. The 2D object has one or more 2D vertices indicative of a location of the 2D object in the 2D space. The method further comprises determining one or more latent variables in the 2D space based on the object information and the one or more 2D vertices, and generating a 2D feature database including the one or more latent variables.

Another embodiment provides a system comprising at least one processor and a non-transitory processor-readable memory device storing instructions that when executed by the at least one processor causes the at least one processor to perform operations including acquiring 3D content comprising a 3D object in 3D space. The 3D object has object information indicative of a location of the 3D object in the 3D space. The operations further include projecting the 3D object to a 2D object in 2D space based on the object information. The 2D object has one or more 2D vertices indicative of a location of the 2D object in the 2D space. The operations further include determining one or more latent variables in the 2D space based on the object information and the one or more 2D vertices, and generating a 2D feature database including the one or more latent variables.

One embodiment provides a non-transitory processor-readable medium that includes a program that when executed by a processor performs a method comprising acquiring 3D content comprising a 3D object in 3D space. The 3D object has object information indicative of a location of the 3D object in the 3D space. The method further comprises projecting the 3D object to a 2D object in 2D space based on the object information. The 2D object has one or more 2D vertices indicative of a location of the 2D object in the 2D space. The method further comprises determining one or more latent variables in the 2D space based on the object information and the one or more 2D vertices, and generating a 2D feature database including the one or more latent variables.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
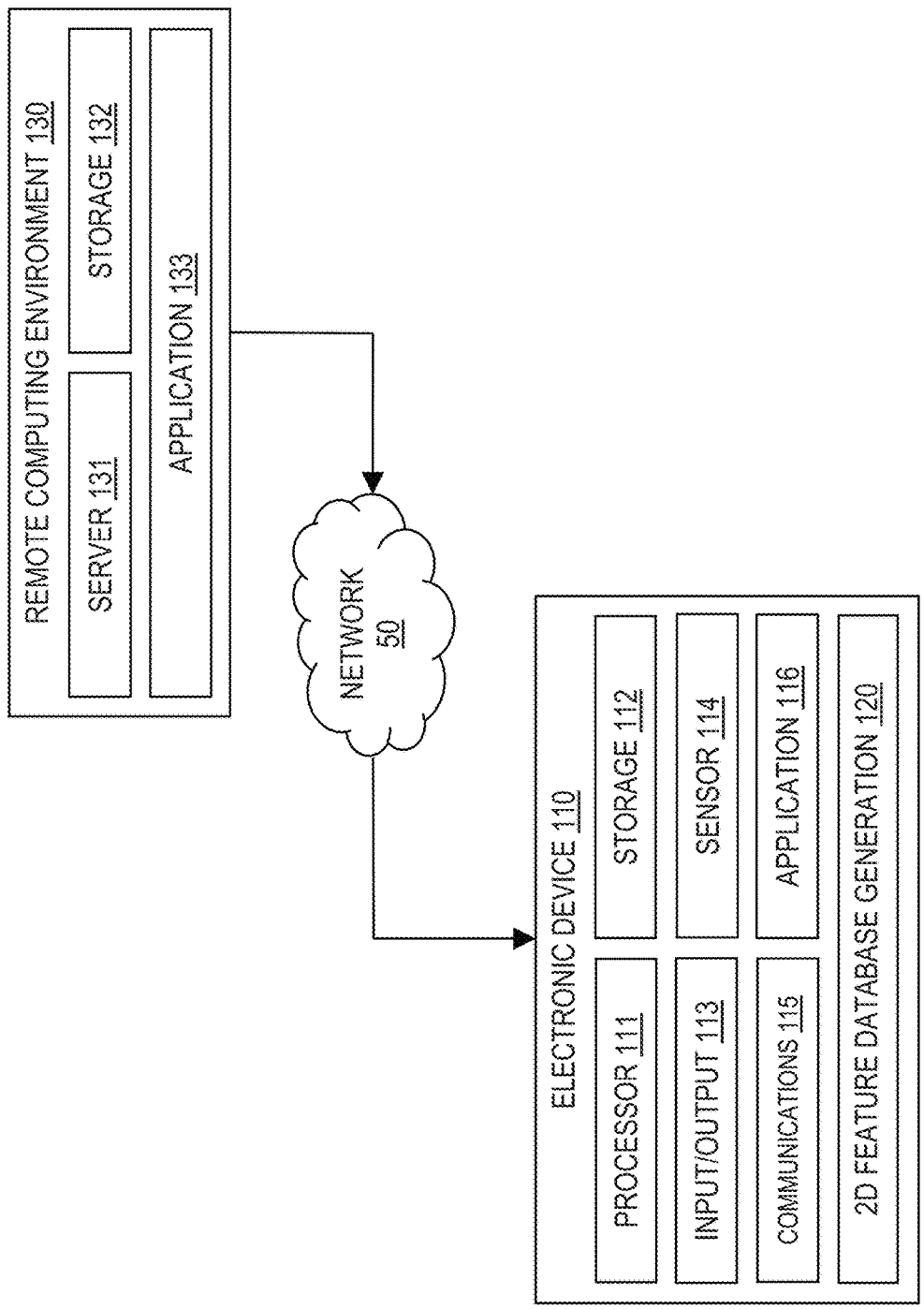
FIG. 1 is an example computing architecture for implementing 2D feature database generation, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to generating training data for artificial intelligence, in particular, a method and system of generating a 2D feature database. One embodiment provides a method comprising acquiring 3D content comprising a 3D object in 3D space. The 3D object has object information indicative of a location of the 3D object in the 3D space. The method further comprises projecting the 3D object to a 2D object in 2D space based on the object information. The 2D object has one or more 2D vertices indicative of a location of the 2D object in the 2D space. The method further comprises determining one or more latent variables in the 2D space based on the object information and the one or more 2D vertices, and generating a 2D feature database including the one or more latent variables.

Another embodiment provides a system comprising at least one processor and a non-transitory processor-readable memory device storing instructions that when executed by the at least one processor causes the at least one processor to perform operations including acquiring 3D content comprising a 3D object in 3D space. The 3D object has object information indicative of a location of the 3D object in the 3D space. The operations further include projecting the 3D object to a 2D object in 2D space based on the object information. The 2D object has one or more 2D vertices indicative of a location of the 2D object in the 2D space. The operations further include determining one or more latent variables in the 2D space based on the object information and the one or more 2D vertices, and generating a 2D feature database including the one or more latent variables.

One embodiment provides a non-transitory processor-readable medium that includes a program that when executed by a processor performs a method comprising acquiring 3D content comprising a 3D object in 3D space. The 3D object has object information indicative of a location of the 3D object in the 3D space. The method further comprises projecting the 3D object to a 2D object in 2D space based on the object information. The 2D object has one or more 2D vertices indicative of a location of the 2D object in the 2D space. The method further comprises determining one or more latent variables in the 2D space based on the object information and the one or more 2D vertices, and generating a 2D feature database including the one or more latent variables.

One or more embodiments provide a method and system for generating training data based on synthetic 3D objects. Specifically, the 3D objects are projected on a 2D image, and various latent variables/features in 2D space are determined based on the 2D image. The latent variables/features represent ground truth data that are included in the training data for use in training an AI engine. The training data allows a more effective and efficient AI engine to be built.

FIG. 1 is an example computing architecture 100 for implementing 2D feature database generation, in one or more embodiments. The computing architecture 100 comprises an electronic device 110 including computing resources, such as one or more processor units 111 and one or more storage units 112. One or more applications may execute/operate on the electronic device 110 utilizing the computing resources of the electronic device 110.

In one embodiment, the one or more applications on the electronic device 110 include a 2D feature database generation system 120 that provides a solution for generating a 2D feature database for use as training data. The system 120 is configured to: (1) acquire a piece of 3D content comprising one or more 3D objects in 3D space, wherein the one or more 3D objects has one or more attributes, (2) project the one or more 3D objects from 3D space to 2D space, resulting in a rendered 2D image comprising one or more 2D objects projected from the one or more 3D objects, wherein each 2D object has corresponding 2D vertices in 2D space, (3) extracting one or more ground truth latent variables/features in the 2D space based on the one or more attributes of the one or more 3D objects and 2D vertices corresponding to each projected 2D object, and (4) generating a 2D feature database comprising the rendered 2D image and features including the one or more ground truth latent variables/features.

Examples of an electronic device 110 include, but are not limited to, a television (e.g., a smart television), a mobile electronic device (e.g., an optimal frame rate tablet, a smart phone, a laptop, etc.), a wearable device (e.g., a smart watch, a smart band, a head-mounted display, smart glasses, etc.), a gaming console, a video camera, a media playback device (e.g., a DVD player), a set-top box, an Internet of Things (IoT) device, a cable box, a satellite receiver, etc.

In one embodiment, the electronic device 110 comprises one or more sensor units 114 integrated in or coupled to the electronic device 110, such as a camera, a microphone, a GPS, a motion sensor, etc.

In one embodiment, the electronic device 110 comprises one or more input/output (I/O) units 113 integrated in or coupled to the electronic device 110. In one embodiment, the one or more I/O units 113 include, but are not limited to, a physical user interface (PUI) and/or a graphical user interface (GUI), such as a keyboard, a keypad, a touch interface, a touch screen, a knob, a button, a display screen, etc. In one embodiment, a user can utilize at least one I/O unit 113 to configure one or more user preferences, configure one or more parameters, provide user input, etc.

In one embodiment, the one or more applications on the electronic device 110 may further include one or more software mobile applications 116 loaded onto or downloaded to the electronic device 110, such as a camera application, a social media application, a video streaming application, etc. A software mobile application 116 on the electronic device 110 may exchange data with the 2D feature database generation system 120.

In one embodiment, the electronic device 110 comprises a communications unit 115 configured to exchange data with a remote computing environment, such as a remote computing environment 130 over a communications network/connection 50 (e.g., a wireless connection such as a Wi-Fi connection or a cellular data connection, a wired connection, or a combination of the two). The communications unit 115 may comprise any suitable communications circuitry operative to connect to a communications network and to exchange communications operations and media between the electronic device 110 and other devices connected to the same communications network 50. The communications unit 115 may be operative to interface with a communications network using any suitable communications protocol such as, for example, Wi-Fi (e.g., an IEEE 802.11 protocol), Bluetooth high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 130 includes computing resources, such as one or more servers 131 and one or more storage units 132. One or more applications 133 that provide higher-level services may execute/operate on the remote computing environment 130 utilizing the computing resources of the remote computing environment 130.

In one embodiment, a remote computing environment 130 provides an online platform for hosting one or more online services (e.g., a video streaming service, etc.) and/or distributing one or more software mobile applications 116. For example, the 2D feature database generation system 120 may be loaded onto or downloaded to the electronic device 110 from a remote computing environment 130 that maintains and distributes updates for the system 120. As another example, a remote computing environment 130 may comprise a cloud computing environment providing shared pools of configurable computing system resources and higher-level services.

In one embodiment, the 2D feature database generation system 120 is integrated into, or implemented as part of, a learning based image or vision processing system.

Figure 2A:
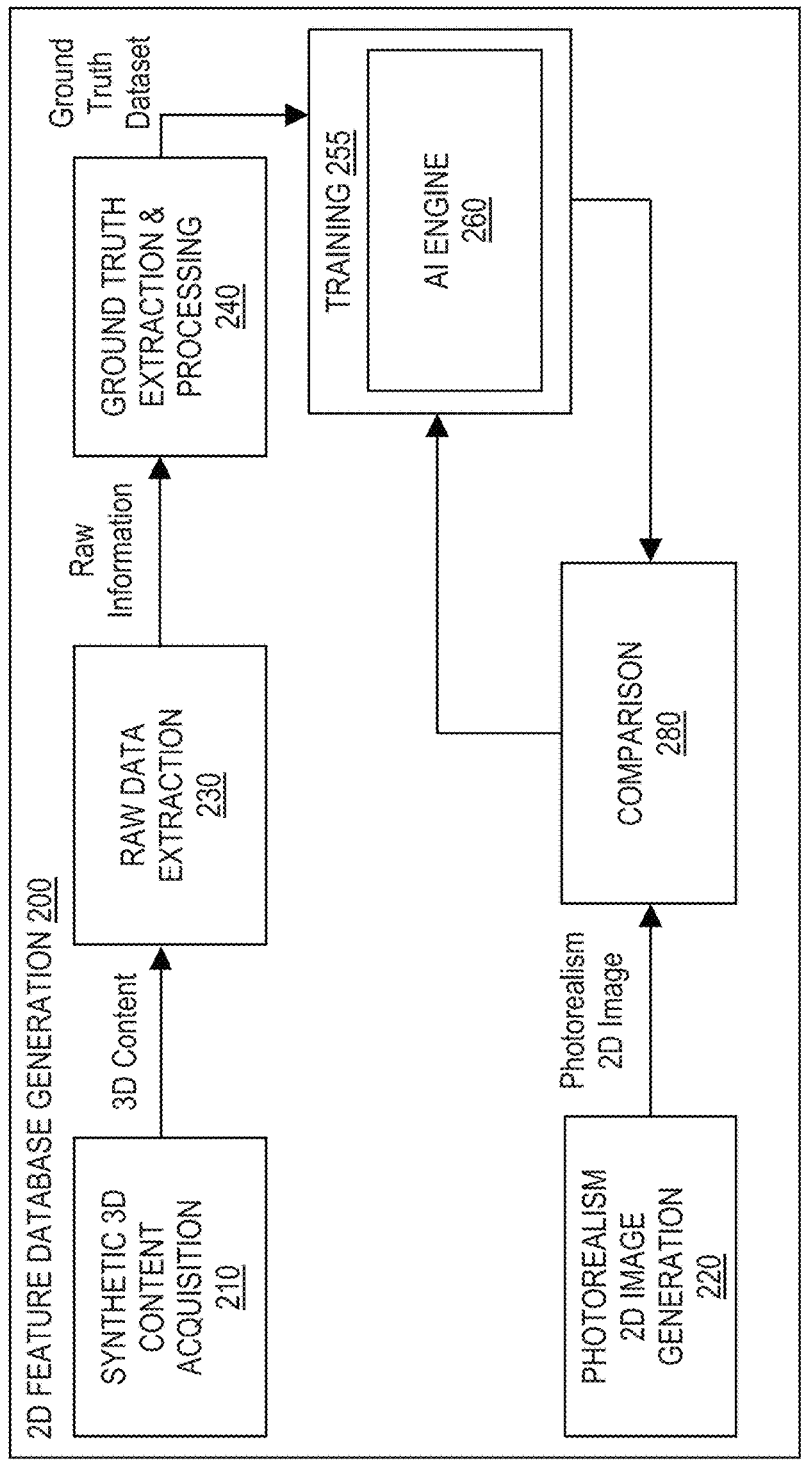
FIG. 2A illustrates an example 2D feature database generation system, in one or more embodiments.

FIG. 2A illustrates an example 2D feature database generation system 200, in one or more embodiments. In one embodiment, the 2D feature database generation system 120 in FIG. 1 is implemented as the 2D feature database generation system 200. In one embodiment, the system 200 comprises a synthetic 3D content acquisition unit 210 configured to acquire one or more pieces of 3D content. Each piece of 3D content represents an artificially created virtual 3D world comprising one or more 3D objects (i.e., 3D models) in 3D space. Each 3D object has one or more corresponding attributes. Attributes corresponding to a 3D object include, but are not limited to, 3D vertices indicative of a location of the 3D object in 3D space.

In one embodiment, the synthetic 3D content acquisition unit 210 is configured to generate one or more 3D objects in 3D space, resulting in a piece of 3D content. In one embodiment, at least one piece of 3D content acquired by the synthetic 3D content acquisition unit 210 includes a piece of 3D content generated by the synthetic 3D content acquisition unit 210.

As a virtual 3D world of a piece of 3D content is artificially created, semantic information relating to the virtual 3D world is known. For example, the virtual 3D world may capture a scene created by a content creator (e.g., a director), and the scene has one or more scene characteristics desired by the content creator and included in the known semantic information. The known semantic information includes, but is not limited to, at least one of: shapes of the 3D objects, 3D structures of the 3D objects, textures of the 3D objects, object motion of the 3D objects, camera motion of a virtual motion camera, etc.

In one embodiment, the system 200 comprises a photo-realism 2D image generation unit 220 configured to generate one or more photorealism 2D images. Each photorealism 2D image includes one or more photorealism 2D frames. Each photorealism 2D image represents ground truth (i.e., a ground truth image).

In one embodiment, the system 200 comprises a raw data extraction unit 230 configured to: (1) receive one or more pieces of 3D content (e.g., from the synthetic 3D content acquisition unit 210), and (2) extract raw information from the one or more pieces of 3D content, resulting in corresponding extracted raw information.

In one embodiment, the system 200 comprises a ground truth extraction and processing system 240 configured to: (1) receive extracted raw information (e.g., from the raw data extraction unit 230) corresponding to one or more pieces of 3D content, and (2) generating a ground truth dataset comprising ground truth information corresponding to the one or more pieces of 3D content by processing the extracted raw information. As described in detail later herein, the processing includes applying one or more processing algorithms/techniques to the extracted raw information. In one embodiment, ground truth information corresponding to a piece of 3D content comprises one or more ground truth latent variables/features in 2D space such as, but not limited to, a motion vector (e.g., of a 3D object of the piece of 3D content), optical flow (e.g., of a 3D object of the piece of 3D content), occlusion, a 2D segmentation, an edge (i.e., edge detection), one or more colors, a brightness or luminance, contrast, a depth, an environment variable (e.g., blur, fog, noise), etc. Ground truth information corresponding to a piece of 3D content is indicative of geometry, color, light, culling, etc.

In one embodiment, the system 200 comprises a training system 255 configured to: (1) receive a ground truth dataset (e.g., from the ground truth extraction and processing system 240), and (2) train an artificial intelligence (AI) engine 260 based on training data including the ground truth dataset, resulting in a trained AI engine 260. In one embodiment, the AI engine 260 is a learning network trained via machine learning, such as a neural network.

In one embodiment, the trained AI engine 260 is configured to: (1) receive, as input, an image (e.g., a real image captured by a real camera), (2) estimate or predict one or more latent variables/features of the image, and (3) provide, as output, the one or more latent variables/features estimated or predicted.

In one embodiment, the system 200 comprises a comparison unit 280 configured to: (1) receive one or more photorealism 2D images representing one or more ground truth images (e.g., from the photorealism 2D image generation unit 220), (2) extract one or more ground truth latent variables/features from the one or more photorealism 2D images (e.g., ground truth optical flow, ground truth occlusion, etc.), (3) provide the one or more photorealism 2D images to the trained AI engine 260 as input, (4) receive one or more latent variables/features estimated or predicted by the trained AI engine 260 for the one or more photorealism 2D images (e.g., estimated optical flow, estimated occlusion, etc.), (5) perform a comparison between the one or more ground truth latent variables/features and the one or more latent variables/features estimated or predicted, and (6) based on the comparison, provide updated training data to the training system 255, wherein the updated training data includes one or more changes to one or more ground truth latent variables/features. In one embodiment, the training system 255 is configured to perform an iterative training algorithm in which the trained AI engine 260 is updated or retrained based on updated training data (e.g., from the comparison unit 280), thereby improving accuracy, quality, and/or performance of the trained AI engine 260.

In one embodiment, the trained AI engine 260 is deployed for use in image or vision processing applications.

In one embodiment, the system 200 generates at least the following two types of ground truth datasets: (1) a first ground truth dataset (generated via the ground truth extraction and processing system 240) comprising one or more ground truth latent variables/features in 2D space, and (2) a second ground truth dataset (generated via the photorealism 2D image generation unit 220) comprising one or more photorealism 2D images. Both the first ground truth dataset and the second ground truth dataset are used to train and/or update/retrain the AI engine 260.

Figure 2B:
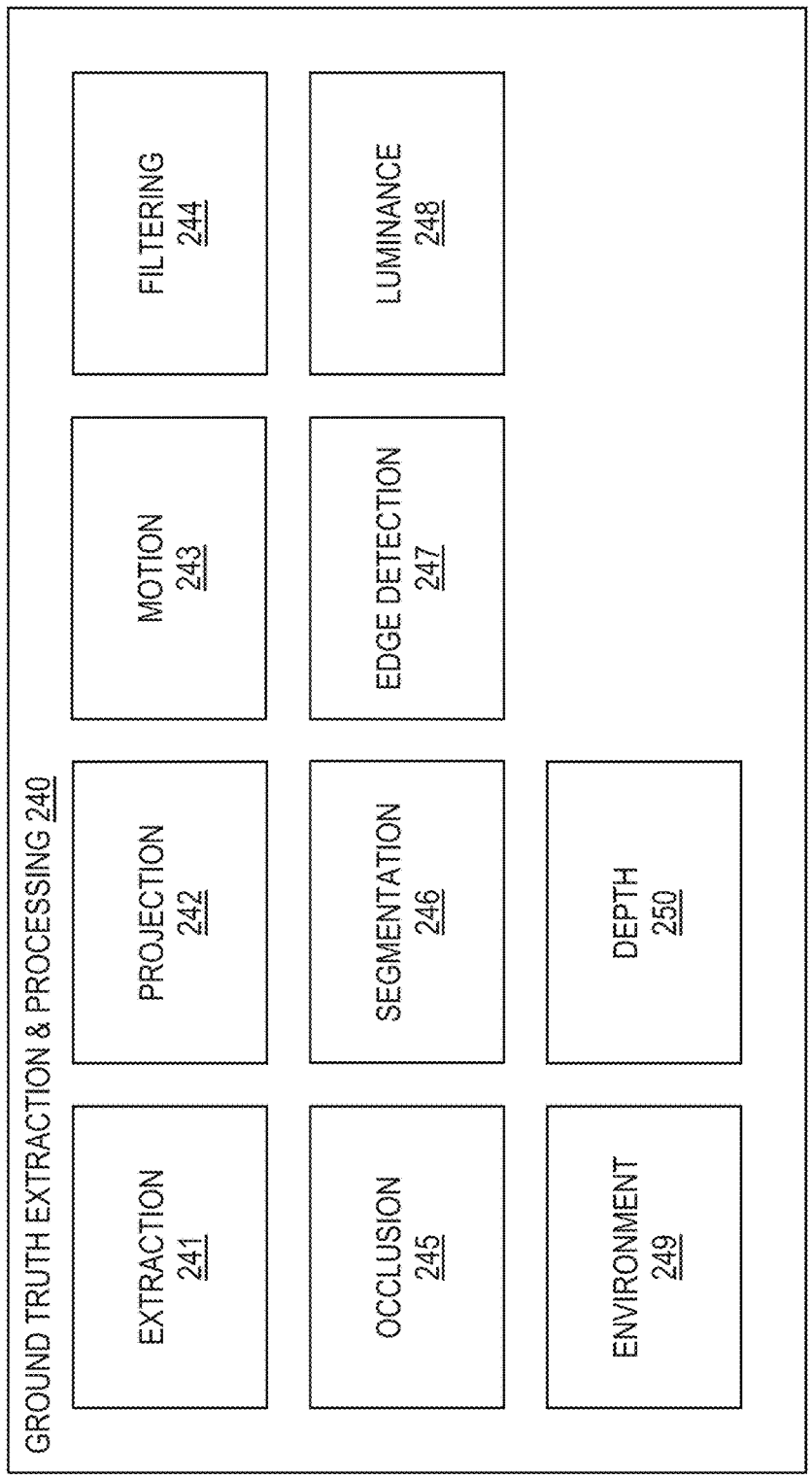
FIG. 2B illustrates an example ground truth extraction and processing system, in one or more embodiments.

FIG. 2B illustrates an example ground truth extraction and processing system 240, in one or more embodiments. In one embodiment, the system 240 includes an extraction unit 241 configured to: (1) receive raw information extracted from at least one piece of 3D content (e.g., from the raw data extraction unit 230), and (2) for each 3D object of the at least one piece of 3D content, extract one or more corresponding 3D vertices from the raw information.

In one embodiment, the system 240 includes a projection unit 242 configured to project each 3D object of the at least one piece of 3D content to a corresponding 2D object in 2D space. Specifically, for each 3D object of the at least one piece of 3D content, the projection unit 242 is configured to: (1) receive one or more corresponding 3D vertices (e.g., from the extraction unit 241), and (2) perform a projection of the one or more corresponding 3D vertices to one or more corresponding 2D vertices in 2D space. In one embodiment, the projection involves applying ray tracing and ray casting.

In one embodiment, the system 240 includes a motion unit 243 configured to determine, for each 3D object of the at least one piece of 3D content, a motion vector of a corresponding 2D object in 2D space (i.e., the 2D object is projected from the 3D object).

In one embodiment, the system 240 includes a filtering unit 244 configured to determine, for each 3D vertex corresponding to a 3D object of the at least one piece of 3D content, validity of a corresponding 2D vertex in 2D space (i.e., the 2D vertex is projected from the 3D vertex).

In one embodiment, the system 240 includes an occlusion unit 245 configured to determine, for each 3D vertex corresponding to a 3D object of the at least one piece of 3D content, whether a corresponding 2D vertex in 2D space is in a covered area (i.e., occluded) or an uncovered area (i.e., not occluded).

In one embodiment, the system 240 includes a segmentation unit 246 configured to determine, for each 3D object of the at least one piece of 3D content, 2D segmentation of a corresponding 2D object in 2D space.

In one embodiment, the system 240 includes an edge detection unit 247 configured to determine, for each 3D object of the at least one piece of 3D content, at least one edge of a corresponding 2D object in 2D space.

In one embodiment, the system 240 includes a luminance unit 248 configured to determine, for each 3D vertex corresponding to a 3D object of the at least one piece of 3D content, a change in luminance (i.e., brightness) of a pixel at a corresponding 2D vertex in 2D space.

In one embodiment, the system 240 includes an environment unit 249 configured to determine, for each 3D object of the at least one piece of 3D content, one or more corresponding environment variables (i.e., parameters) for an environment of a corresponding 2D object in 2D space.

In one embodiment, the system 240 includes a depth unit 250 configured to determine, for each 3D object of the at least one piece of 3D content, depth of a corresponding 2D object in 2D space.

Figure 3:
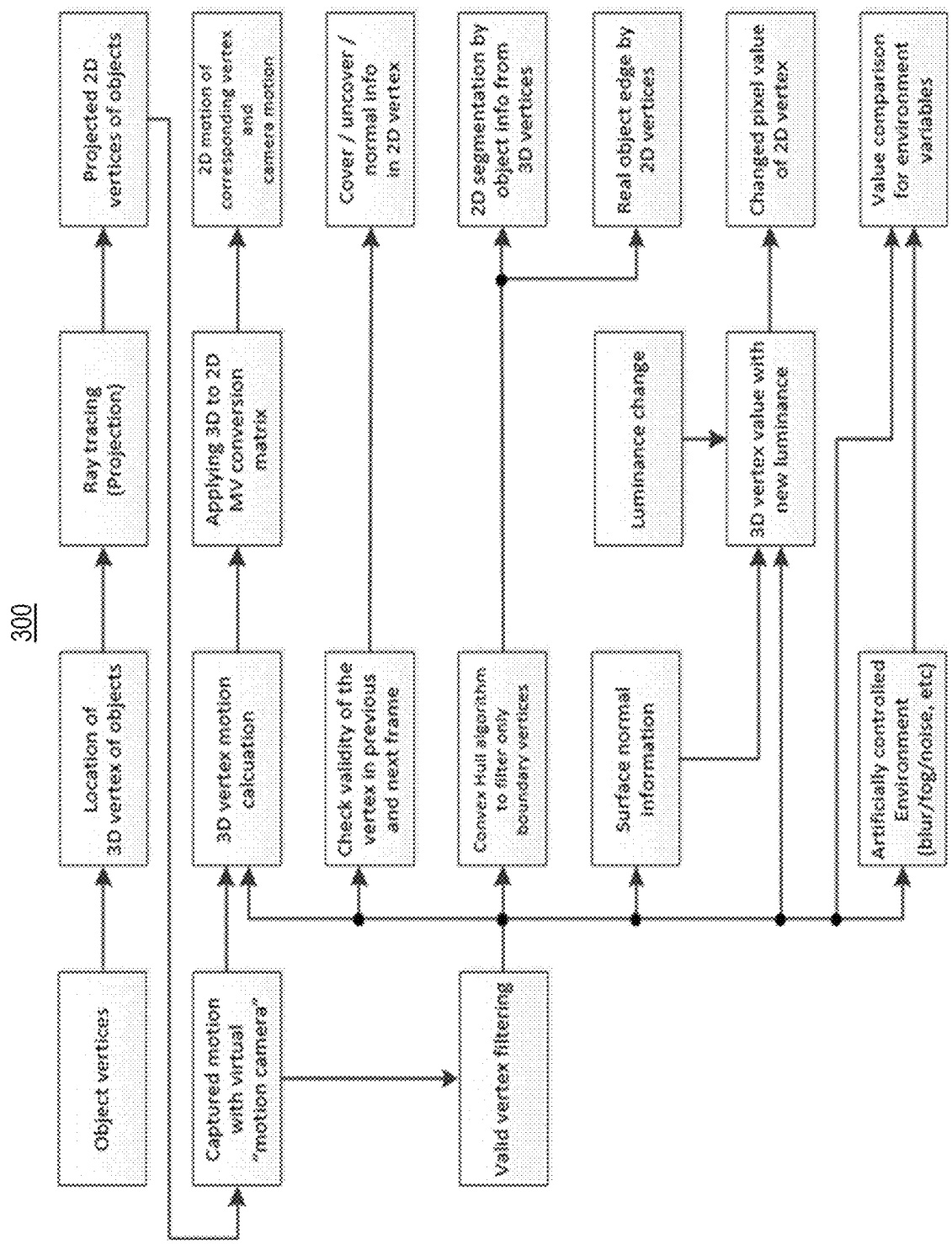
FIG. 3 illustrates an example workflow of the ground truth extraction and processing system, in one or more embodiments.

FIG. 3 illustrates an example workflow 300 of the ground truth extraction and processing system 240, in one or more embodiments. In one embodiment, the system 240 is configured to perform extraction and processing to generate a ground truth dataset including one or more ground truth latent variables/features in 2D space. In one embodiment, the extraction and processing comprises at least the following steps: First, the system 240 receives raw information extracted from at least one piece of 3D content, wherein the raw information comprises a set of object vertices in 3D space.

Next, the system 240 extracts (e.g., via the extraction unit 241) one or more 3D vertices from the set of object vertices, wherein the one or more 3D vertices correspond to one or more 3D objects of the at least one piece of 3D content.

For each 3D vertex corresponding to a 3D object, the system 240 performs projection (e.g., via the projection unit 242) of the 3D vertex in 3D space to a corresponding 2D vertex in 2D space. In one embodiment, the projection involves applying ray tracing and ray casting.

In one embodiment, a ground truth latent variable/feature included in the ground truth dataset is a motion vector in 2D space. Specifically, for each 3D vertex corresponding to a 3D object, the system 240 determines (e.g., via the motion unit 243) a motion vector of a corresponding 2D vertex in 2D space (i.e., the 2D vertex is projected from the 3D vertex) by: (1) determining motion of the 3D object ("object motion in 3D space"), wherein the object motion in 3D space is captured via a virtual motion camera, (2) determining motion of the 3D vertex based on the object motion in 3D space and a 3D structure of the 3D object (e.g., the 3D structure is included in known semantic information relating to the at least one piece of 3D content), and (3) applying a conversion matrix to the motion of the 3D vertex and camera motion (of the virtual motion camera) in 3D space to obtain motion of a corresponding 2D vertex and background motion in 2D space, respectively. A motion of a 2D vertex represents a motion vector in 2D space capturing motion of the 2D vertex. In one embodiment, a motion vector of a 2D vertex/2D object (e.g., projected from a 3D vertex/3D object) is a forward motion vector in 2D space capturing forward motion of the 2D vertex/2D object. In one embodiment, a motion vector of a 2D vertex/2D object (e.g., projected from a 3D vertex/3D object) is a backward motion vector in 2D space capturing backward motion of the 2D vertex/2D object.

In one embodiment, for each feature included in the ground truth dataset, the system 240 performs valid vertex filtering (e.g., via the filtering unit 244). Valid vertex filtering involves the system 240 determining, for each 3D vertex corresponding to a 3D object, validity of a corresponding 2D vertex in 2D space (i.e., the 2D vertex is projected from the 3D vertex) based on a motion vector corresponding to the 2D vertex.

In one embodiment, a ground truth latent variable/feature included in the ground truth dataset is occlusion information in 2D space. The occlusion information is indicative of one or more covered areas and one or more uncovered areas in a sequence of image frames included in the at least one piece of 3D content. In one embodiment, for each 3D vertex corresponding to a 3D object, the occlusion information is indicative of whether a corresponding 2D vertex in 2D space is in a covered area (i.e., occluded) or an uncovered area (i.e., not occluded). As described in detail later herein, the system 240 determines (e.g., via the occlusion unit 245): (1) whether a 2D vertex in 2D space is in a covered area based on a forward motion vector of the 2D vertex, and (2) whether the 2D vertex is in an uncovered area based on a backward motion vector of the 2D vertex.

In one embodiment, a ground truth latent variable/feature included in the ground truth dataset is segmentation information in 2D space. For each 3D object with a corresponding 2D object in 2D space (i.e., the 2D object is projected from the 3D object), the segmentation information is indicative of 2D segmentation of the corresponding 2D object. Specifically, for each 3D object with a corresponding 2D object in 2D space, the system 240 determines (e.g., via the segmentation unit 246) 2D segmentation of the corresponding 2D object by: (1) applying a convex Hull algorithm to filter only one or more corresponding boundary 3D vertices that define a boundary or outline of the 3D object in 3D space, and (2) determining the 2D segmentation of the corresponding 2D object based the one or more corresponding boundary 3D vertices.

In one embodiment, a ground truth latent variable/feature included in the ground truth dataset is edge detection information in 2D space. For each 3D object with a corresponding 2D object in 2D space, the edge detection information is indicative of at least one edge of the corresponding 2D object, wherein each edge has corresponding 2D vertices in 2D space. Specifically, for each 3D object with a corresponding 2D object in 2D space, the system 240 determines (e.g., via the edge detection unit 247) at least one edge of the corresponding 2D object by: (1) applying a convex Hull algorithm to filter only one or more corresponding boundary 3D vertices that define a boundary or outline of the 3D object in 3D space, and (2) determining the at least one edge of the corresponding 2D object based on the one or more corresponding boundary 3D vertices. The system 240 determines whether a 2D vertex in 2D space is inside a 2D object or on a boundary of the 2D object based on the edge detection information.

As luminance (i.e., brightness) in a virtual 3D world is artificially controlled, the ground truth dataset can include information capturing different image intensities resulting from changes in luminance. In one embodiment, a ground truth latent variable/feature included in the ground truth dataset is luminance information in 2D space. For each 3D vertex corresponding to a 3D object, the luminance information includes a value of a pixel at a corresponding 2D vertex in 2D space. Specifically, for each 3D vertex corresponding to a 3D object, the system 240 determines (e.g., via the luminance unit 248) a value of a pixel at a corresponding 2D vertex in 2D space by: (1) determining corresponding surface normal information indicative of a surface normal of the 3D object, (2) detecting a luminance change for a value of a pixel at the 3D vertex, (3) determining a new value of the pixel at the 3D vertex based on the corresponding surface normal information and the luminance change, and (3) determining a new value of a pixel at the corresponding 2D vertex based on the new value of the pixel at the 3D vertex.

As an environment in a virtual 3D world is artificially controlled, the ground truth dataset can include information capturing different environment variables (i.e., parameters). In one embodiment, a ground truth latent variable/feature included in the ground truth dataset is an environment variable in 2D space. Examples of environment variables include, but are not limited to, blur (e.g., motion blur), fog (e.g., foggy weather), noise, etc. Specifically, for each 3D object, the system 240 determines (e.g., via the environment unit 249) one or more corresponding environment variables for an environment of the 3D object, and performs a value comparison based on the one or more corresponding environment variables to determine one or more corresponding environment variables for an environment of a corresponding 2D object in 2D space.

As depth of objects in a virtual 3D world is artificially controlled, the ground truth dataset can include information capturing different depths (i.e., different distances relative to a human eye). In one embodiment, a ground truth latent variable/feature included in the ground truth dataset is depth information in 2D space. For each 3D vertex corresponding to a 3D object, the depth information includes a depth of a corresponding 2D vertex in 2D space. Specifically, for each 3D vertex corresponding to a 3D object, the system 240 estimates (e.g., via the depth unit 250) a depth of a corresponding 2D vertex in 2D space based on a depth of the 3D vertex (e.g., the depth of the 3D vertex is included in attributes of the 3D object or the known semantic information relating to the at least one piece of 3D content).

Figure 4A:
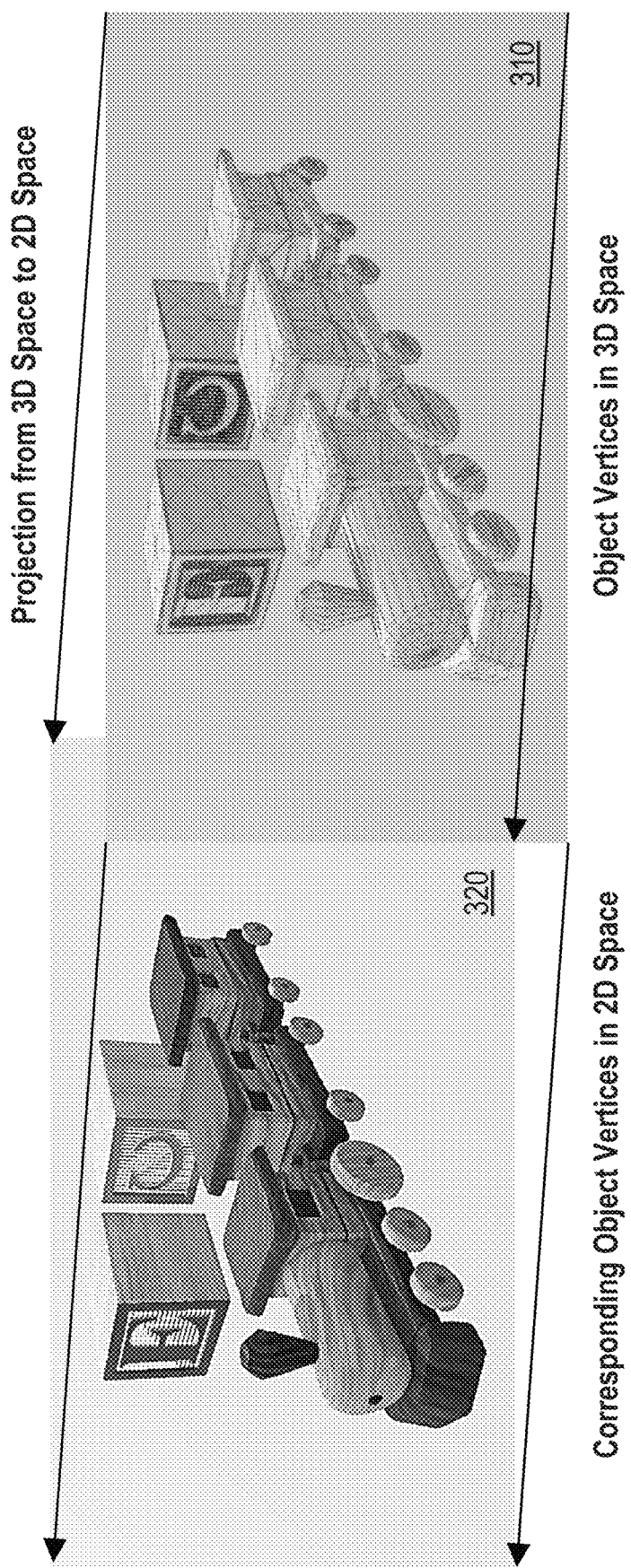
FIG. 4A illustrates an example projection of 3D objects from 3D space to 2D space, in one or more embodiments.

FIG. 4A illustrates an example projection of 3D objects from 3D space to 2D space, in one or more embodiments. In one embodiment, the system 200 generates, via the synthetic 3D content acquisition unit 210, a piece 310 of 3D content. The piece 310 of 3D content represents a virtual 3D world comprising a collection of 3D objects (e.g., a toy train, toy blocks, etc.) in 3D space. Each 3D object has one or more corresponding object vertices in 3D space indicative of one or more 3D vertices defining the 3D object in 3D space. The synthetic 3D content acquisition unit 210 generates the 3D objects and applies texturing to the 3D objects utilizing synthetic/photorealism technology.

The ground truth extraction and processing system 240 performs a projection of the 3D objects from 3D space to 2D space, resulting in a rendered 2D image 320 comprising 2D objects projected from the 3D objects. The projection involves, for each 3D object, projecting one or more corresponding object vertices in 3D space to one or more corresponding object vertices in 2D space (e.g., projecting object vertices in 3D space that correspond to the toy train to corresponding object vertices in 2D space). For each 3D object, one or more corresponding object vertices in 2D space are indicative of one or more 2D vertices defining a 2D object in 2D space that is projected from the 3D object. In one embodiment, the projection involves applying ray tracing and ray casting.

Figure 4B:
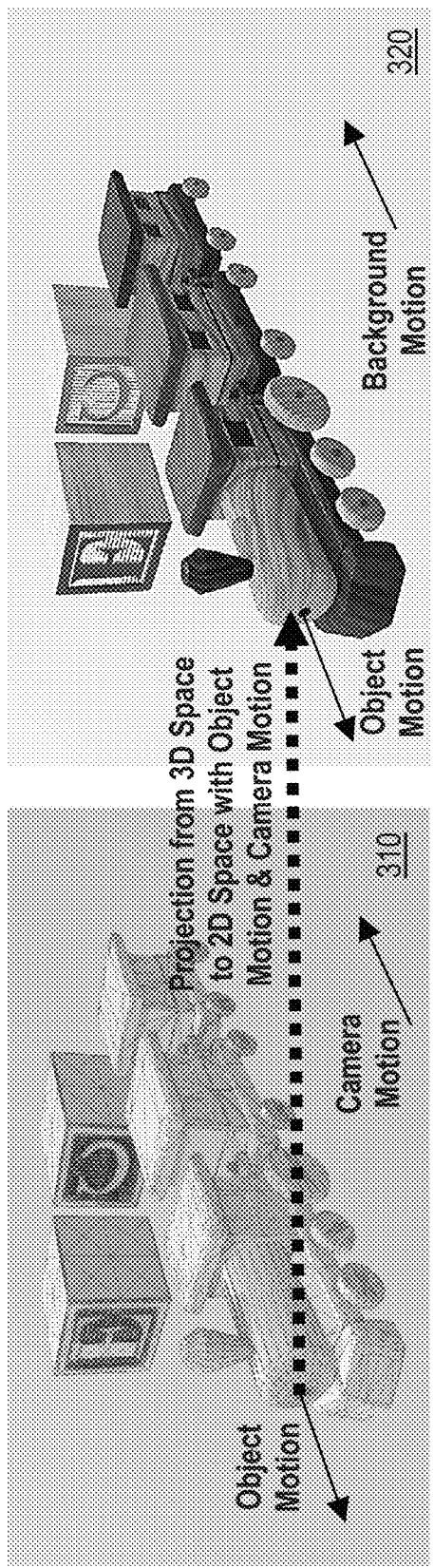
FIG. 4B illustrates object motion of a 3D object in 3D space and object motion of a 2D object in 2D space that is projected from the 3D object, in one or more embodiments.

FIG. 4B illustrates object motion of a 3D object in 3D space and object motion of a 2D object in 2D space that is projected from the 3D object, in one or more embodiments. In one embodiment, a motion vector is a ground truth latent variable/feature included in a ground truth dataset generated by the ground truth extraction and processing system 240. For example, for each 3D object (e.g., a toy train) of the piece 310 of 3D content, the system 240 is configured to determine a motion vector of a corresponding 2D object of the rendered 2D image 320 (i.e., the 2D object is projected from the 3D object). The motion vector is based on a motion of each 3D vertex in 3D space that corresponds to the 3D object and camera motion in 3D space. The system 240 determines a motion of each 3D vertex in 3D space that corresponds to a 3D object based on object motion of the 3D object and a 3D structure of the 3D object. The 3D structure is included in the known semantic information relating to the virtual 3D world.

In one embodiment, a background motion in 2D space is projected from the camera motion in 3D space.

Figure 4C:
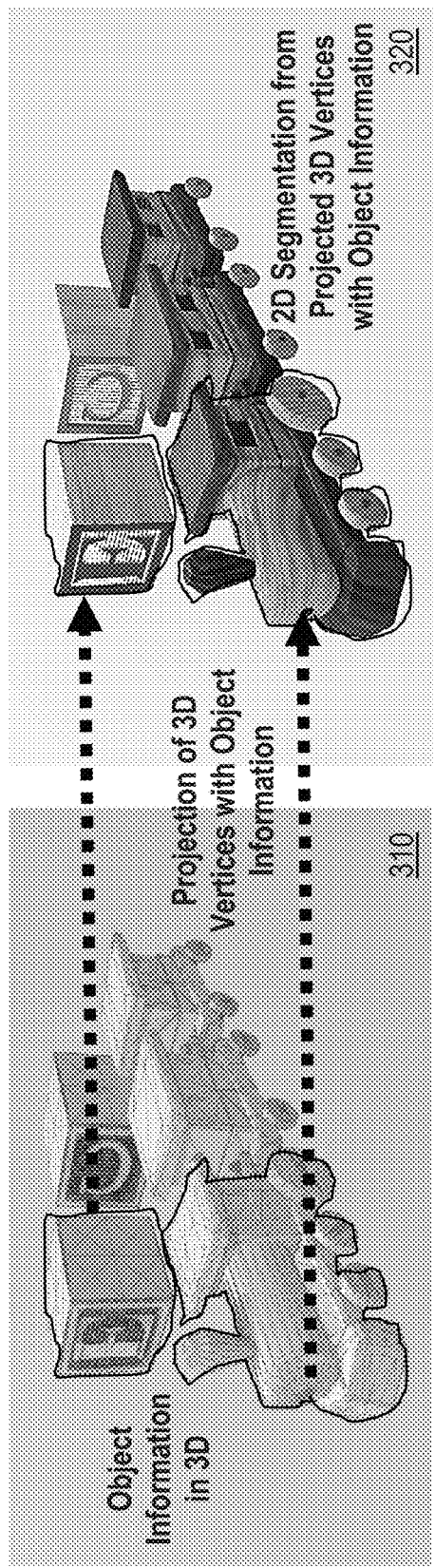
FIG. 4C illustrates 2D segmentation of a 2D object in 2D space that is projected from a 3D object in 3D space, in one or more embodiments.

FIG. 4C illustrates 2D segmentation of a 2D object in 2D space that is projected from a 3D object in 3D space, in one or more embodiments. In one embodiment, segmentation information is a ground truth latent variable/feature included in a ground truth dataset generated by the ground truth extraction and processing system 240. For example, for each 3D object (e.g., a toy train, a toy block) of the piece 310 of 3D content, the system 240 is configured to determine 2D segmentation of a corresponding 2D object of the rendered 2D image 320, wherein the 2D object is projected from the 3D object. The 2D segmentation is based in part on object information corresponding to the 3D object, such as corresponding boundary 3D vertices that define a boundary or outline of the 3D object in 3D space.

In one embodiment, depth information is a ground truth latent variable/feature included in a ground truth dataset generated by the ground truth extraction and processing system 240. For example, for each 3D object (e.g., a toy block) of the piece 310 of 3D content, the system 240 is configured to determine depth of a corresponding 2D object of the rendered 2D image 320 (e.g., the toy block is behind the toy train), wherein the 2D object is projected from the 3D object. The depth of the 2D object is based in part on object information corresponding to the 3D object, such as depth of the 3D object.

Figure 5:
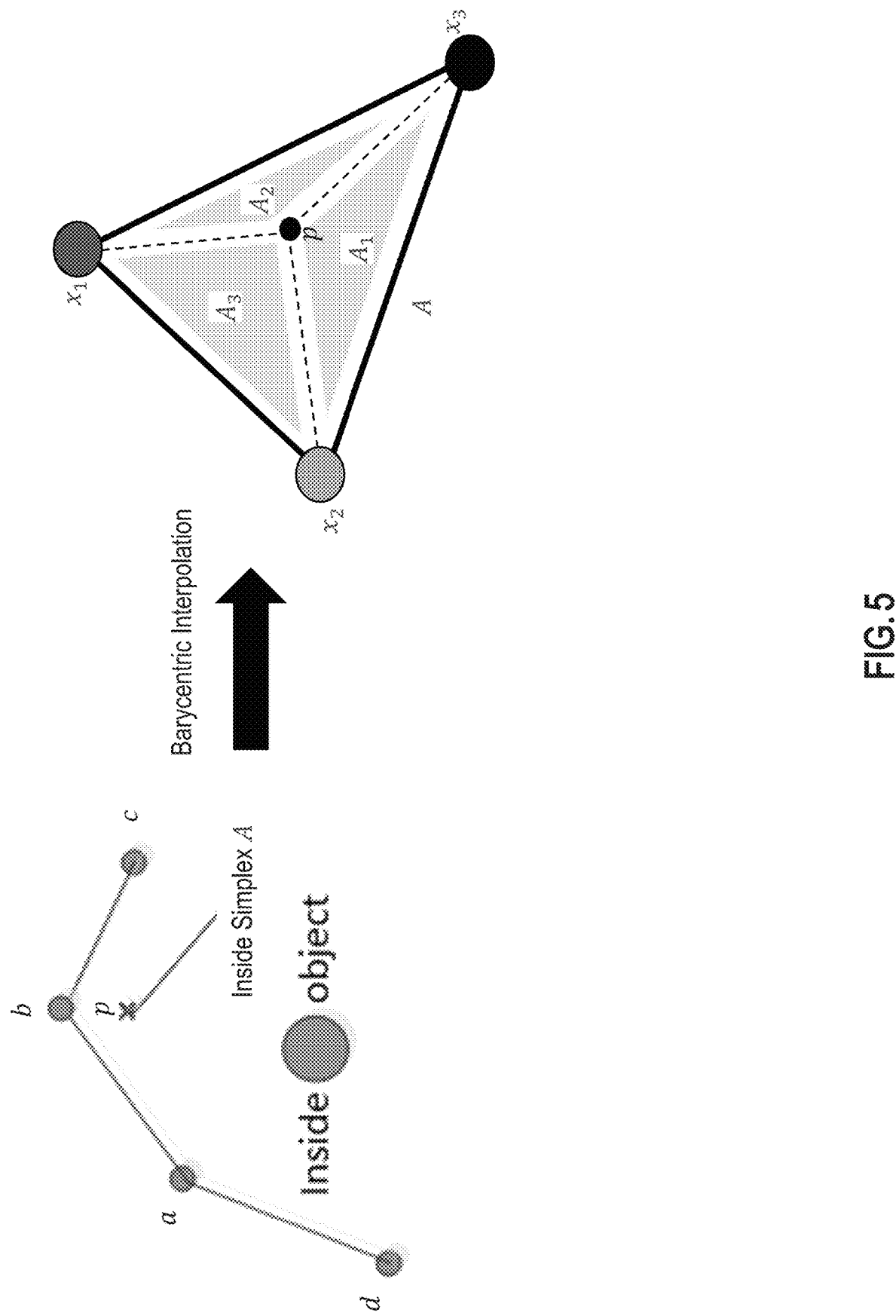
FIG. 5 illustrates barycentric interpolation implemented by the ground truth extraction and processing system, in one or more embodiments.

FIG. 5 illustrates barycentric interpolation implemented by the ground truth extraction and processing system 240, in one or more embodiments. In one embodiment, the system 240 determines if a pixel at a 2D vertex in 2D space is either included or not included in a 2D object projected from a 3D object in 3D space. If a pixel at a 2D vertex in 2D space is included in a 2D object (e.g., pixels a, b, c, and d) the system 240 assumes the 2D vertex has a corresponding 3D vertex in 3D space (i.e., the 2D vertex is projected from the corresponding 3D vertex), and determines a motion vector corresponding to the 2D vertex based on motion of the 3D vertex and camera motion. If a pixel at a 2D vertex in 2D space is not included in a 2D object (e.g., pixel p), the system 240 assumes the 2D vertex does not have a corresponding 3D vertex in 3D space, and estimates a motion vector corresponding to the pixel utilizing one or more interpolation techniques. The one or more interpolation techniques include, but are not limited to, barycentric interpolation.

For example, a location of pixel p in a barycentric coordinate system is specified by reference to a simplex A with vertices $x_1$, $x_2$, and $x_3$. Masses $A_1$, $A_2$, and $A_3$ form the simplex A, such that pixel p is the center of mass of these masses. The masses $A_1$, $A_2$, and $A_3$ represent an amount (i.e., percent) of red, an amount of green, and an amount of blue, respectively, in the simplex A. Barycentric coordinates $\lambda_1$, $\lambda_2$, and $\lambda_3$ of pixel p are based on the masses $A_1$, $A_2$, and $A_3$, wherein $$\lambda_1 = \frac{A_1}{A}, \lambda_2 = \frac{A_2}{A}, \lambda_3 = \frac{A_3}{A},$$

and $\Sigma_i \lambda_i = 1$. In one embodiment, a value of pixel p is determined in accordance with equation (1) provided below:

value of pixel $p=(A_1 x_1 + A_2 x_2 + A_3 x_3)/A$     (1).

Figure 6:
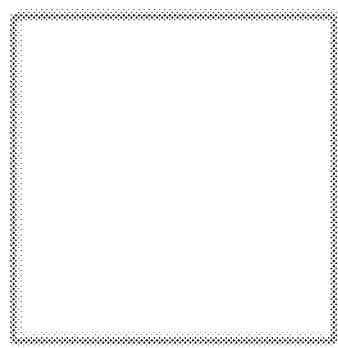
FIG. 6 illustrates different types of blocks, in one or more embodiments.
Figure 6:
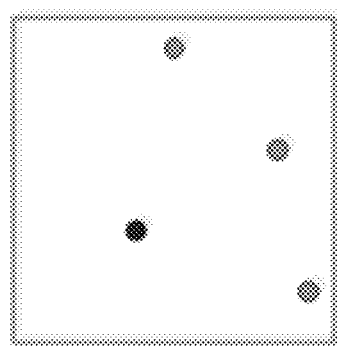
Figure 6:
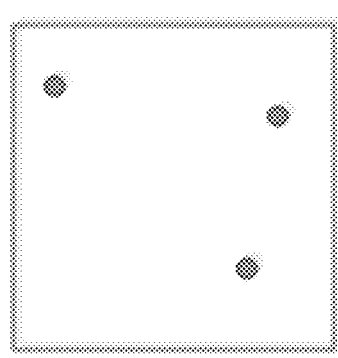

FIG. 6 illustrates different types of blocks, in one or more embodiments. In one embodiment, for each 3D object of a piece of 3D content, each 3D vertex corresponding to the 3D object is either within a block of a pre-determined size or outside of the block. For example, a block may comprise multiple 3D vertices corresponding to the same 3D object of a piece of 3D content. As another example, a block may comprise multiple 3D vertices corresponding to different 3D objects of a piece of 3D content. As yet another example, a block may not comprise any 3D vertices (i.e., 3D vertices corresponding to any 3D object of a piece of 3D content are outside of the block).

In one embodiment, the ground truth extraction and processing system 240 utilizes one or more block-based approaches to process extracted raw information. A block-based approach involves selecting, for each 3D object of a piece of 3D content, a limited number of corresponding representative values (i.e., 3D vertices corresponding to the 3D object) that are within a block of a pre-determined size. Each corresponding representative value selected is utilized by the system 240 for determining one or more ground truth latent variables/features of the ground truth dataset.

In one embodiment, for each 3D object of a piece of 3D content, the system 240 determines a local deviation between 3D vertices corresponding to the 3D object, wherein the 3D vertices are within a block of a pre-determined size. If the local deviation is small (e.g., does not exceed a pre-determined threshold value), the system 240 selects only one 3D vertex corresponding to the 3D object from the block as a corresponding representative value. If the local deviation is not small (e.g., meets or exceeds the pre-determined threshold value), the system 240 invokes one or more methods for selecting a corresponding representative value from the block. For example, in one embodiment, the system 240 applies a clustering method (e.g., k-means, Expectation Maximization, etc.) to the block, and selects at least one corresponding representative value that is either the closest value from a dominant cluster center within the block or the closest value from the cluster center within the block.

As another example, in one embodiment, the system 240 applies an order statistics method to the block, and selects a corresponding representative value that is from $k^{th}$ smallest value among the 3D vertices within the block, and median is $(n/2)^{th}$ value from n sample. As another example, in one embodiment, the system 240 selects a corresponding representative value that is a mean value among the 3D vertices within the block. As another example, in one embodiment, the system 240 selects a corresponding representative value that is a min/max value among the 3D vertices within the block. As another example, in one embodiment, the system 240 selects a corresponding representative value that is a weighted average among the 3D vertices within the block. If each 3D vertex is represented by a multi-dimensional vector, a magnitude of the multi-dimensional vector may also be used for the order statistics method, selecting based on the mean value, selecting based on the min/max value, or selecting based on the weighted average.

In one embodiment, the system 240 does not project any 3D vertex corresponding to a 3D object of a piece of 3D content that is not within a block of a pre-determined size. Each block projected to 2D space must have at least one 3D vertex within the block that corresponds to a 3D object or background scenery. In one embodiment, for each 3D object generated via the synthetic 3D content acquisition unit 210, a number of 3D vertices corresponding to the 3D object is equal to a block_size/2, wherein block_size is a pre-determined size of a block.

Figure 7:
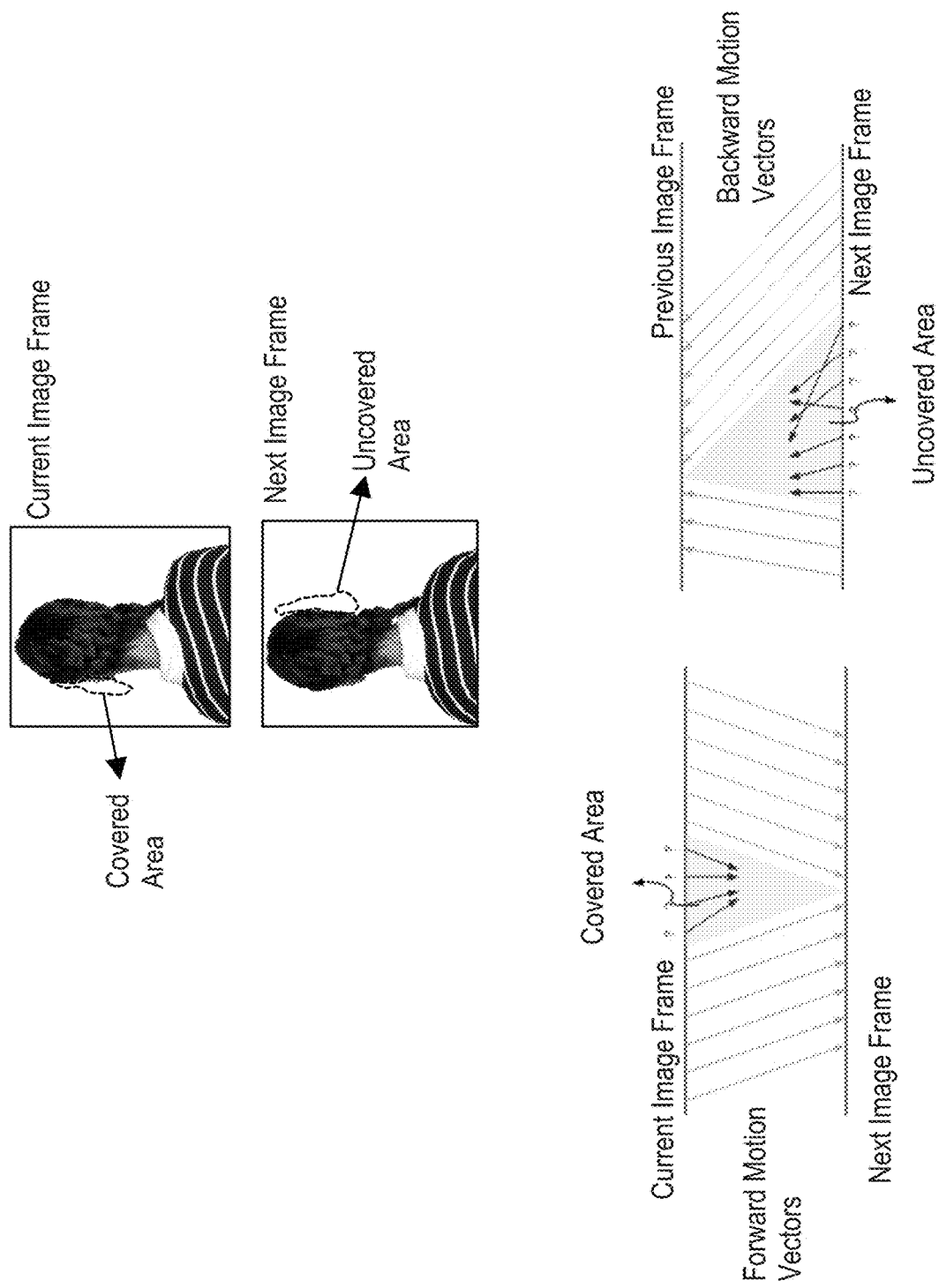
FIG. 7 illustrates example covered areas and uncovered areas in a sequence of image frames, in one or more embodiments.

FIG. 7 illustrates example covered areas and uncovered areas in a sequence of image frames, in one or more embodiments. For each 3D vertex corresponding to a 3D object and included in a current image frame of the sequence, the system 240 determines (e.g., via the occlusion unit 245) whether a corresponding 2D vertex in 2D space is in a covered area by: (1) obtaining a forward motion vector of the corresponding 2D vertex, wherein the forward motion vector points out a different 2D vertex in a next image frame of the sequence, and (2) determining the corresponding 2D vertex is in a covered area if the different vertex in the next image frame is either an invalid vertex in 2D space or projected from a different 3D vertex that is behind a different 3D object in 3D space. For example, if the sequence captures the back of a girl who moves, a covered area represents a spatial area that is occupied by the girl's head as she moves.

For each 3D vertex corresponding to a 3D object and included in a current image frame of the sequence, the system 240 determines (e.g., via the occlusion unit 245) whether a corresponding 2D vertex in 2D space is in an uncovered area by: (1) obtaining a backward motion vector of the corresponding 2D vertex, wherein the backward motion vector points out a different 2D vertex in a next image frame of the sequence, and (2) determining the corresponding 2D vertex is in an uncovered area if the different vertex in the next image frame is either an invalid vertex in 2D space or projected from a different 3D vertex that is behind a different 3D object in 3D space. For example, if the sequence captures the back of a girl who moves, an uncovered area represents a spatial area that is no longer occupied by the girl's head as she moves.

Figure 8:
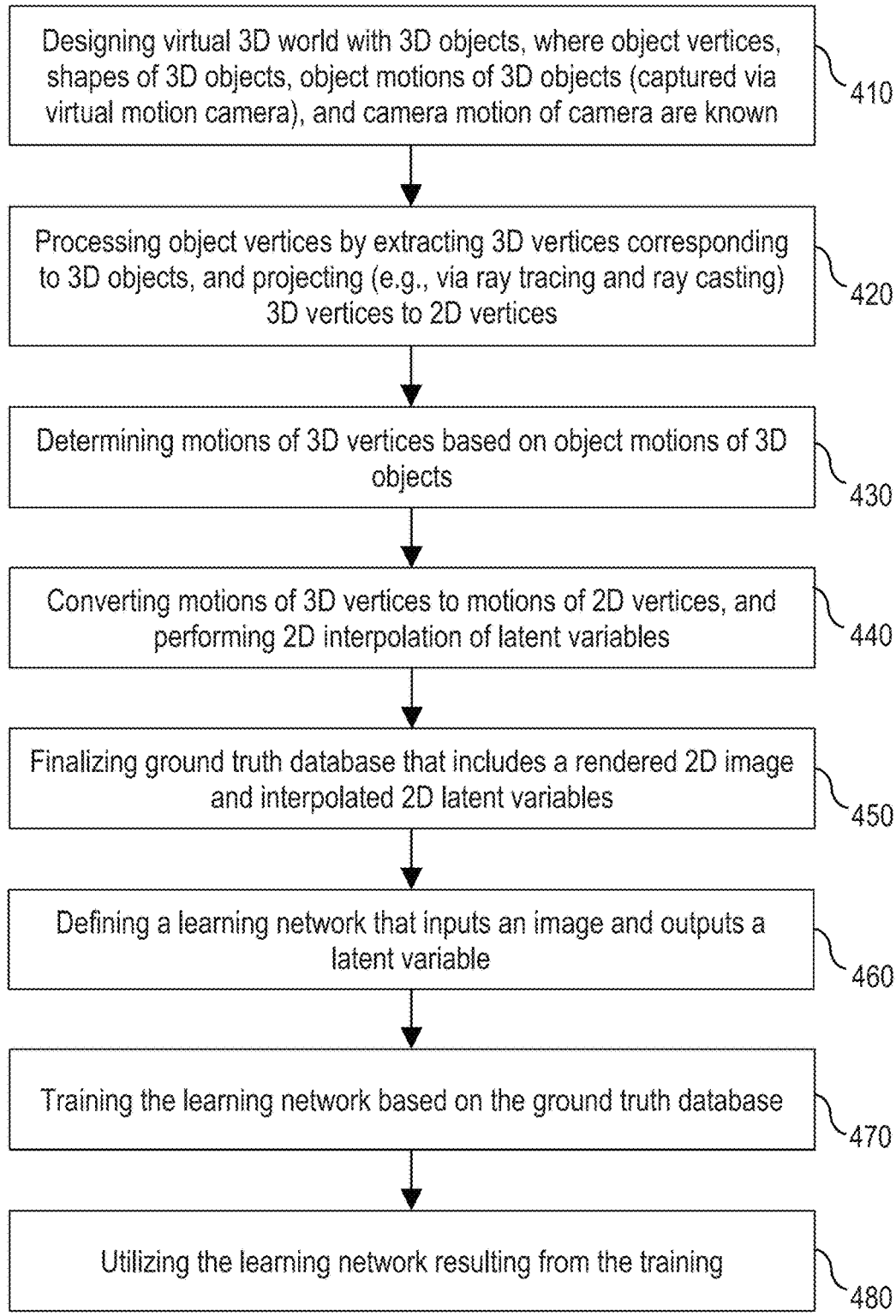
FIG. 8 is a flowchart of an example process for 2D feature database generation, in one or more embodiments.

FIG. 8 is a flowchart of an example process 400 for 2D feature database generation, in one or more embodiments. Process block 410 includes designing (e.g., via the synthetic 3D content acquisition unit 210) a virtual 3D world with one or more 3D objects, where object vertices of the 3D objects, shapes of the 3D objects, object motions of the 3D objects (captured via a virtual motion camera), and camera motion of the camera are known. Process block 420 includes processing (e.g., via the ground truth extraction and processing system 240) the object vertices by extracting 3D vertices corresponding to the 3D objects, and projecting (e.g., via ray tracing and ray casting) the 3D vertices to 2D vertices. Process block 430 includes determining (e.g., via the ground truth extraction and processing system 240) motions of the 3D vertices based on the object motions of the 3D objects. Process 440 includes converting (e.g., via the ground truth extraction and processing system 240) the motions of the 3D vertices to motions of 2D vertices, and performing 2D interpolation of one or more latent variables (i.e., ground truth latent variables). Process 450 includes finalizing (e.g., via the ground truth extraction and processing system 240) a ground truth database that includes a rendered 2D image and one or more interpolated 2D latent variables. Process 460 includes defining (e.g., via the training system 255) a learning network (e.g., the AI engine 260) that inputs an image and outputs a latent variable (i.e., the latent variable is estimated or predicted by the learning network). Process 470 includes training (e.g., via the training system 255) the learning network based on the ground truth database. Process 480 includes utilizing the learning network resulting from the training (e.g., deploying the learning network for use in image or vision processing applications).

In one embodiment, process blocks 410-480 may be performed by one or more components of the 2D feature database generation system 200.

Figure 9:
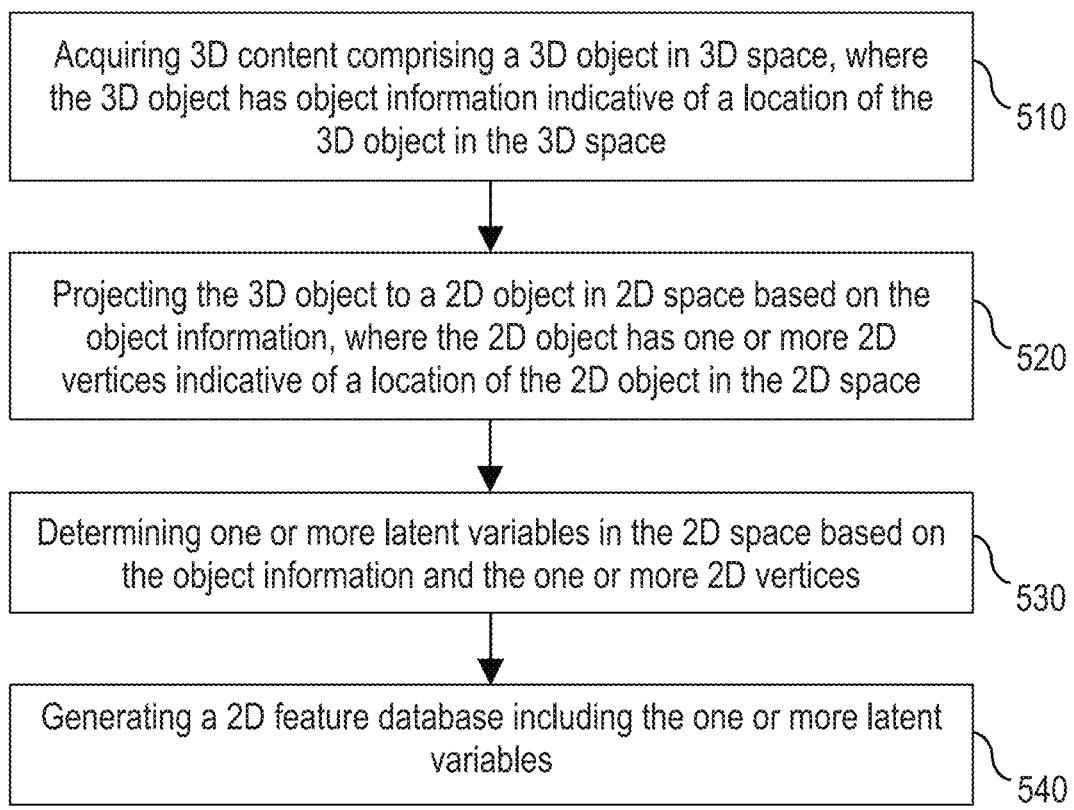
FIG. 9 is a flowchart of an example process for 2D feature database generation.

FIG. 9 is a flowchart of an example process 500 for 2D feature database generation. Process block 510 includes acquiring (e.g., via the synthetic 3D content acquisition unit 210) 3D content comprising a 3D object in 3D space, where the 3D object has object information indicative of a location of the 3D object in the 3D space. Process block 520 includes projecting (e.g., via the ground truth extraction and processing system 240) the 3D object to a 2D object in 2D space based on the object information, where the 2D object has one or more 2D vertices indicative of a location of the 2D object in the 2D space. Process block 530 includes determining (e.g., via the ground truth extraction and processing system 240) one or more latent variables (i.e., ground truth latent variables) in the 2D space based on the object information and the one or more 2D vertices. Process 540 includes generating (e.g., via the ground truth extraction and processing system 240) a 2D feature database including the one or more latent variables.

In one embodiment, process blocks 510-540 may be performed by one or more components of the 2D feature database generation system 200.

Figure 10:
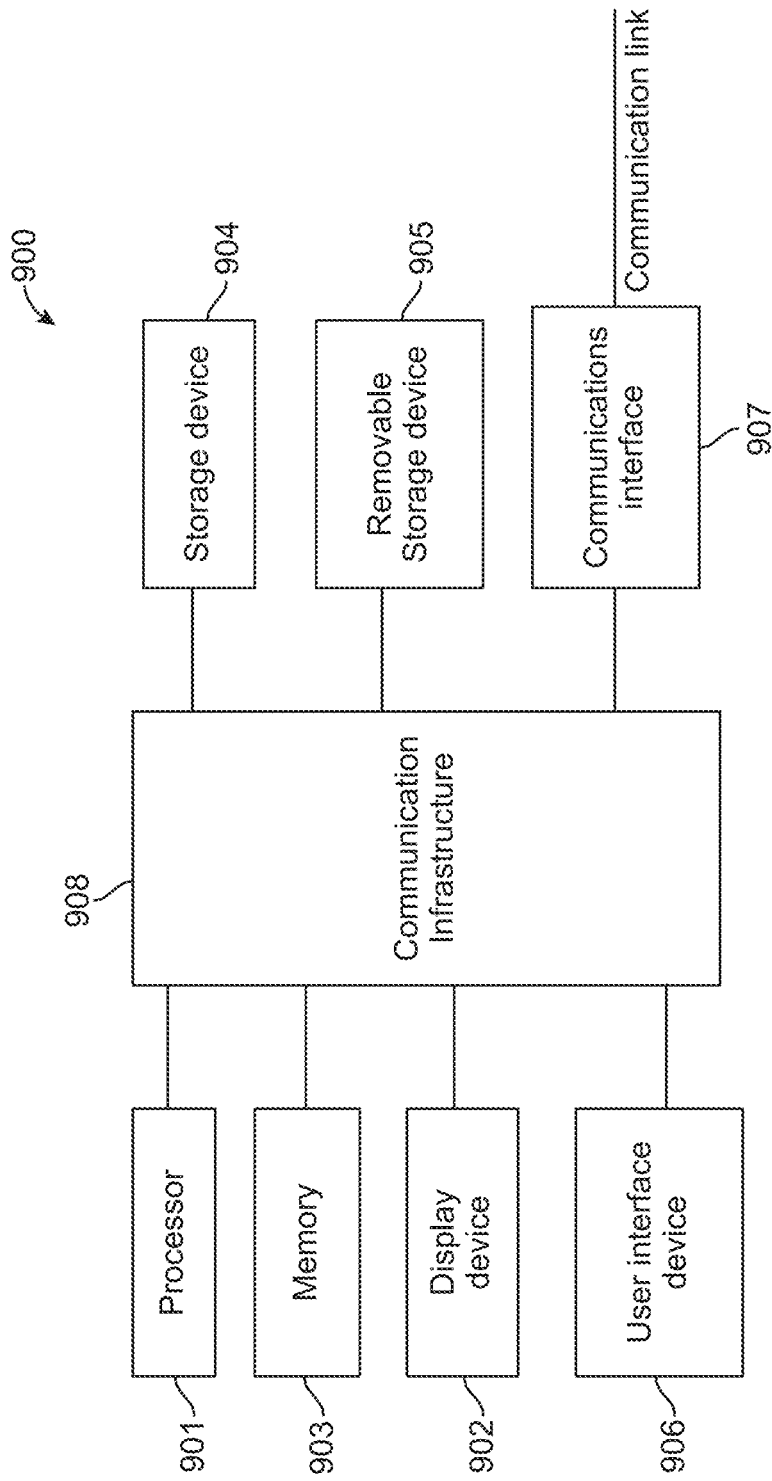
FIG. 10 is a high-level block diagram showing an information processing system comprising a computer system useful for implementing the disclosed embodiments.

FIG. 10 is a high-level block diagram showing an information processing system comprising a computer system 900 useful for implementing the disclosed embodiments. The systems 120 and 200 may be incorporated in the computer system 900. The computer system 900 includes one or more processors 901, and can further include an electronic display device 902 (for displaying video, graphics, text, and other data), a main memory 903 (e.g., random access memory (RAM)), storage device 904 (e.g., hard disk drive), removable storage device 905 (e.g., removable storage drive, removable memory module, a magnetic tape drive, optical disk drive, computer readable medium having stored therein computer software and/or data), viewer interface device 906 (e.g., keyboard, touch screen, keypad, pointing device), and a communication interface 907 (e.g., modem, a network interface (such as an Ethernet card), a communications port, or a PCMCIA slot and card). The communication interface 907 allows software and data to be transferred between the computer system and external devices. The system 900 further includes a communications infrastructure 908 (e.g., a communications bus, cross-over bar, or network) to which the aforementioned devices/modules 901 through 907 are connected.

Information transferred via communications interface 907 may be in the form of signals such as electronic, electromagnetic, optical, or other signals capable of being received by communications interface 907, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 400 (FIG. 8) and/or process 500 (FIG. 9) may be stored as program instructions on the memory 903, storage device 904, and/or the removable storage device 905 for execution by the processor 901.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
acquiring 3D content comprising a 3D object in 3D space, wherein the 3D object has object information indicative of a location of the 3D object in the 3D space;
rendering a 2D image comprising a 2D object in 2D space by projecting the 3D object from the 3D space to the 2D space based on the object information, wherein the 2D object has one or more 2D vertices indicative of a location of the 2D object in the 2D space;
determining one or more latent variables in the 2D space based on the object information and the one or more 2D vertices;
determining validity for the one or more 2D vertices based on a corresponding motion vector; and
generating a 2D feature database including the rendered 2D image and the one or more latent variables.

2. The method of claim 1, wherein the object information comprises one or more 3D vertices indicative of the location of the 3D object in the 3D space, and determining validity for the one or more 2D vertices comprises determining, for each 3D vertex corresponding to a 3D object, validity of a corresponding 2D vertex in 2D space.

3. The method of claim 2, further comprising:
extracting the one or more 3D vertices from the object information; and
projecting, via ray tracing and ray casting, the one or more 3D vertices to the one or more 2D vertices;
wherein the motion vector corresponds to the corresponding 2D vertex.

4. The method of claim 1, further comprising:
generating the 3D object.

5. The method of claim 1, wherein the one or more latent variables include at least one of: a motion vector of the 2D object, an optical flow vector of the 2D object, a 2D segmentation of the 2D object, occlusion information indicative of whether the one or more 2D vertices are occluded, at least one edge of the 2D object, a depth of the 2D object, an environmental parameter for an environment of the 2D object, or luminance of the one or more 2D vertices.

6. The method of claim 1, further comprising:
training an artificial intelligence (AI) engine based on the 2D feature database, wherein the AI engine is configured to estimate at least one feature of an image in response to receiving the image.

7. The method of claim 1, further comprising:
generating one or more photorealism images; and
updating the AI engine based in part on the one or more photorealism images.

8. A system comprising:
at least one processor; and
a non-transitory processor-readable memory device storing instructions that when executed by the at least one processor causes the at least one processor to perform operations including:
acquiring 3D content comprising a 3D object in 3D space, wherein the 3D object has object information indicative of a location of the 3D object in the 3D space;
rendering a 2D image comprising a 2D object in 2D space by projecting the 3D object from the 3D space to the 2D space based on the object information, wherein the 2D object has one or more 2D vertices indicative of a location of the 2D object in the 2D space;
determining one or more latent variables in the 2D space based on the object information and the one or more 2D vertices;
determining validity for the one or more 2D vertices based on a corresponding motion vector; and
generating a 2D feature database including the rendered 2D image and the one or more latent variables.

9. The system of claim 8, wherein the object information comprises one or more 3D vertices indicative of the location of the 3D object in the 3D space, and determining validity for the one or more 2D vertices comprises determining, for each 3D vertex corresponding to a 3D object, validity of a corresponding 2D vertex in 2D space.

10. The system of claim 9, wherein:
the operations further comprise:
extracting the one or more 3D vertices from the object information; and
projecting, via ray tracing and ray casting, the one or more 3D vertices to the one or more 2D vertices; and
the motion vector corresponds to the corresponding 2D vertex.

11. The system of claim 8, wherein the operations further comprise:
generating the 3D object.

12. The system of claim 8, wherein the one or more latent variables include at least one of: a motion vector of the 2D object, an optical flow vector of the 2D object, a 2D segmentation of the 2D object, occlusion information indicative of whether the one or more 2D vertices are occluded, at least one edge of the 2D object, a depth of the 2D object, an environmental parameter for an environment of the 2D object, or luminance of the one or more 2D vertices.

13. The system of claim 8, wherein the operations further comprise:
training an artificial intelligence (AI) engine based on the 2D feature database, wherein the AI engine is configured to estimate at least one feature of an image in response to receiving the image.

14. The system of claim 8, wherein the operations further comprise:
generating one or more photorealism images; and
updating the AI engine based in part on the one or more photorealism images.

15. A non-transitory processor-readable medium that includes a program that when executed by a processor performs a method comprising:
acquiring 3D content comprising a 3D object in 3D space, wherein the 3D object has object information indicative of a location of the 3D object in the 3D space;
rendering a 2D image comprising a 2D object in 2D space by projecting the 3D object from the 3D space to the 2D space based on the object information, wherein the 2D object has one or more 2D vertices indicative of a location of the 2D object in the 2D space;

determining one or more latent variables in the 2D space based on the object information and the one or more 2D vertices;

determining validity for the one or more 2D vertices based on a corresponding motion vector; and generating a 2D feature database including the rendered 2D image and the one or more latent variables.

16. The non-transitory processor-readable medium of claim 15, wherein the object information comprises one or more 3D vertices indicative of the location of the 3D object in the 3D space, and determining validity for the one or more 2D vertices comprises determining, for each 3D vertex corresponding to a 3D object, validity of a corresponding 2D vertex in 2D space.

17. The non-transitory processor-readable medium of claim 16, wherein:

the method further comprises:

extracting the one or more 3D vertices from the object information; and projecting, via ray tracing and ray casting, the one or more 3D vertices to the one or more 2D vertices; and the motion vector corresponds to the corresponding 2D vertex.

18. The non-transitory processor-readable medium of claim 15, wherein the method further comprises:

generating the 3D object.

19. The non-transitory processor-readable medium of claim 15, wherein the one or more latent variables include at least one of: a motion vector of the 2D object, an optical flow vector of the 2D object, a 2D segmentation of the 2D object, occlusion information indicative of whether the one or more 2D vertices are occluded, at least one edge of the 2D object, a depth of the 2D object, an environmental parameter for an environment of the 2D object, or luminance of the one or more 2D vertices.

20. The non-transitory processor-readable medium of claim 15, wherein the method further comprises:

training an artificial intelligence (AI) engine based on the 2D feature database, wherein the AI engine is configured to estimate at least one feature of an image in response to receiving the image.

* * * * *